United States Patent [19]

Olcott

[11] 3,900,668

[45] *Aug. 19, 1975

[54] INTERNAL COMPONENTS FOR GAS TURBINES OF PYROLYTIC GRAPHITE SILICON CARBIDE CODEPOSIT

[75] Inventor: Eugene L. Olcott, Falls Church, Va.

[73] Assignee: Atlantic Research Corporation, Alexandria, Va.

[ * ] Notice: The portion of the term of this patent subsequent to June 12, 1990, has been disclaimed.

[22] Filed: Oct. 30, 1972

[21] Appl. No.: 301,777

Related U.S. Application Data

[63] Continuation-in-part of Ser. No. 161,007, July 9, 1971, Pat. No. 3,717,419, and a continuation-in-part of Ser. No. 65,899, Aug. 21, 1970, Pat. No. 3,738,906.

[52] U.S. Cl. ............... 428/297; 416/241; 428/212; 428/408; 428/392
[51] Int. Cl. ............................................. B32b 5/10
[58] Field of Search.................. 161/168, 169, 206; 117/DIG. 11, 106 C, 169 A, 46 CG; 416/241, 229

[56] References Cited
UNITED STATES PATENTS

| | | | |
|---|---|---|---|
| 3,317,356 | 5/1967 | Clendinning.................... | 117/106 C |
| 3,379,555 | 4/1968 | Hough............................ | 117/106 C |
| 3,391,016 | 7/1968 | McCrary et al................. | 117/106 C |
| 3,464,843 | 11/1969 | Basche........................... | 117/106 C |
| 3,653,851 | 4/1972 | Gruber........................... | 117/106 C |
| 3,676,293 | 7/1972 | Gruber........................... | 161/206 |
| 3,677,795 | 7/1972 | Bokros et al................... | 117/46 CG |
| 3,685,059 | 9/1972 | Bokros et al................... | 117/46 CG |
| 3,717,419 | 2/1973 | Olcott............................ | 416/230 |
| 3,725,110 | 4/1973 | Rodgers et al................. | 117/106 C |
| 3,738,906 | 6/1973 | Olcott............................ | 161/60 |

*Primary Examiner*—George F. Lesmes
*Assistant Examiner*—William R. Dixon, Jr.
*Attorney, Agent, or Firm*—Finnegan, Henderson, Farabow & Garrett

[57] ABSTRACT

Internal components, such as turbine blades for gas turbines composed of a composite of a pyrolytic graphite matrix containing codeposited crystalline silicon carbide. The pyrolytic graphite matrix comprises crystallite layers of pyrolytic graphite and the silicon carbide is in the form of crystalline aciculae. The silicon carbide aciculae are embedded within the pyrolytic graphite crystallites and oriented so that the longitudinal axes are substantially aligned with the c-direction of the crystallites.

9 Claims, 4 Drawing Figures

INTERNAL COMPONENTS FOR GAS TURBINES OF PYROLYTIC GRAPHITE SILICON CARBIDE CODEPOSIT

CROSS REFERENCES TO RELATED APPLICATIONS

The present application is a continuation in part of copending applications Ser. Nos. 161,007, filed July 9, 1971, now U.S. Pat. No. 3,717,419, dated Feb. 20, 1973 and 65,899 filed Aug. 21, 1970 now U.S. Pat. No. 3,738,906, dated June 12, 1973.

FIELD OF THE INVENTION

The present invention relates to internal components, such as rotor blades, etc., for gas turbines, and particularly to components having the strength, durability, and corrosion resistance to withstand operation at high temperatures. More specifically, the present invention relates to internal gas turbine components composed of codeposited pyrolytic graphite and silicon carbide.

BACKGROUND OF THE INVENTION

At present, in gas turbines used in jet engines and the like, internal components such as stator vanes and rotor blades are, from a practical standpoint, limited to maximum operational temperatures of about 1800°F. The blade and vane materials most commonly used are refractory metals such as tungsten, molybdenum, and alloys of cobalt and nickel bases which has sufficient strength and erosion- and oxidation-resistance to perform satisfactorily at temperatures up to about 1800°F. Such blade and vane materials have densities (typically about 0.28 pounds per cubic inch) which can be tolerated under the size and weight constraints imposed in the design of jet engines. If operating temperatures in excess of about 1800°F are attempted, blades and vanes of commonly employed materials will become deformed or will weaken and fracture.

There are of course, materials which are capable of withstanding temperatures greater than 1800°F. However, at such temperatures, these materials have been found to be unsatisfactory for one or more reasons. Such reasons may include a lack of strength, unacceptable size or weight, a tendency to erode or become oxidized in the flow of hot gases, expense, etc.

Because of inherent shortcomings of typical blade and vane materials, gas turbines are typically limited to operation at temperatures below 1800°F. Because gas turbines are temperature limited, they are restricted to operation at power output levels much lower than could be attained merely by increasing the temperature of the gas flow. The state of the art of fuels is such that the combustion gases can be readily generated in the range of 2000°–3500°F and higher. If blade and vane material were available which would operate satisfactorily at these temperature levels, gas turbines could increase their output power by 150–200%.

The present invention involves the use of novel pyrolytic graphite composites as internal components for gas turbines. Hereinafter, for convenience, reference will be made only to turbine blades; it will be understood that such term is to be considered to encompass various internal gas turbine components which will be exposed to hot gases such as stator vanes, rotor blades, shroud rings, etc., within its scope.

Pyrolytic graphite is known to have superior high temperature and corrosion resistance properties. Pyrolytic graphite, however, does have certain disadvantageous properties stemming from its particular crystalline structure. In addition, although pyrolytic graphite is the most oxidation resistant form of carbon, it has a tendency to oxidize at high temperatures in oxidizing atmospheres.

Pyrolytic graphite is normally produced by the pyrolysis of a carbonaceous gas, such as methane or propane, onto a heated substrate. The crystal structure of pyrolytic graphite is characterized by principal grains of cone-like shape which are made of sub-grains or crystallites. The flat, hexagonal crystallites, oriented substantially parallel to the substrate surface, are deposited in layers which build up to an essentially laminar structure.

As defined in "Pyrolytic Graphite Engineering Handbook" prepared by Specialty Alloys Section, Metallurgical Products Dept., General Electric Company, Detroit, Mich. (July 15, 1963) the primary grain structure (cones) is the largest identifiable unit of the structure in which a continuous variation exists in average orientation of basal planes of the crystallites and which is bound by discontinuous variations (cone boundaries). The cones usually follow a geometry approximated by a stack of spherical zones. Each spherical zone can be considered as containing a large number of crystallites. Each crystallite has its own c-axis which is oriented at 90° to the ab-plane and points toward the origin of the cone. Because the spherical cones are actually a curved rather than a flat plane, the c-axis of each crystallite is inclined somewhat from that of adjacent crystallites. Considering the cone in its entirety, the angle of inclination of c-axes may vary widely between the cone boundaries and may differ by as high as 80° and possibly 90° or more.

Pyrolytic graphite cones tend to nucleate from discontinuities in the substrate. Deposit layers (spherical zones) are formed within each cone. These deposit layers represent the ab-layer orientation of the crystallites. The orientation of the c-axes is at 90° to the ab-layer but the c-axes are not at 90° to the deposition surface of the substrate.

As a result of its laminar structure, pyrolytic graphite is highly anisotropic in many of its properties, including strength, heat conductivity, and thermal expansion. This anisotropy presents problems in certain uses of pyrolytic graphite. As an example, the material has an exceedingly high coefficient of thermal expansion in the thickness or c-axis direction and a relatively low coefficient of thermal expansion in the ab-plane of direction. In addition, due to its flat, plate-like, and laminar microstructure, pyrolytic graphite is relatively weak in the c-direction and tends to delaminate under high stress. As a result of these undesirable properties, as well as its tendency to oxidize at high temperatures, pyrolytic graphite is generally not considered a suitable material for gas turbine blades.

In copending U.S. application Ser. No. 65,899, filed Aug. 21, 1970, now U.S. Pat. No. 3,738,906 of which the present application is a continuation-in-part, there are disclosed novel, rigid microcomposites of pyrolytic graphite crystallites containing codeposited crystalline silicon carbide. The silicon carbide is in the form of aciculae embedded in the pyrolytic graphite crystallites. The longitudinal axes of the aciculae are aligned in the c-direction (perpendicular to the ab or flat plane) of the pyrolytic graphite crystallites.

By embedding the laminar pyrolytic graphite crystallites with aciculae of crystalline silicon carbide, oriented in the c-direction of the crystallites, the anisotropy of the graphite and the tendency of the graphite to delaminate are reduced. Additionally, the presence of silicon carbide in the structure substantially improves erosion resistance and oxidation resistance. Silicon carbide is substantially harder than pyrolytic graphite and, unlike carbon, which oxidizes to a gas, silicon oxidizes to solid or liquid silicon dioxide. The silicon dioxide fuses into a protective coating, inhibiting oxidation of the underlying pyrolytic graphite.

In copending U.S. application Ser. No. 161,007 filed July 9, 1971, now U.S. Pat. No. 3,717,419 of which the present application is also a continuation-in-part, gas turbine blades designed to operate at temperatures in excess of 2000°F are disclosed. The turbine blades are composed of a composite material comprising a pyrolytic graphite matrix having at least one reinforcing refractory strand layer disposed in the matrix. The strand layer comprises a plurality of laterally spaced, individual, continuous refractory strands, all of which, in each layer, are substantially unidirectionally oriented. The pyrolytic graphite matrix is nucleated from the laterally connecting strands. The refractory strands may be of any suitable refractory material including graphite, refractory metals, refractory carbides, refractory borides, refractory nitrides, refractory oxides, etc.

Copending application Ser. No. 161,007 (now U.S. Pat. No. 3,717,419) also discloses turbine blades prepared from strand-reinforced pyrolytic graphite composites in which the pyrolytic graphite crystallites contain embedded aciculae of crystalline silicon carbide.

The turbine blades of the present invention are composed of a pyrolytic graphite-crystalline SiC composite capable of withstanding operating temperatures of 2000°F and higher, which does not require embedded strands in the pyrolytic graphite matrix. The composite has greater strength in the thickness dimension, resistance to delamination, and resistance to oxidation than conventional pyrolytic graphite. The turbine blades are relatively light-weight, exhibit no loss in strength at elevated temperatures, and have superior high temperature and erosion resistant properties.

SUMMARY OF THE INVENTION

The present invention is directed to internal components for gas turbines composed of a composite of a pyrolytic graphite matrix containing codeposited silicon carbide. The pyrolytic graphite matrix comprises crystallite layers of pyrolytic graphite while the silicon carbide is in the form of crystalline aciculae. The silicon carbide aciculae are embedded within the pyrolytic graphite crystallites and oriented so that their longitudinal axes are substantially aligned with the c-direction (perpendicular to the ab or flat plane) of the crystallites. The composite is a two-phase system since the pyrolytic graphite and the silicon carbide are mutually insoluble.

The amount of silicon carbide in the matrix should be at least about 5%, and preferably at least about 10%, by volume of the composite. Depending upon the desired properties for a particular turbine blade, the percent of silicon carbide can be as high as about 90%, or even 95% by volume. In general, the turbine blade is preferably composed of about 10 to 50 volume percent silicon carbide with pyrolytic graphite making up the remainder.

Embedding aciculae of silicon carbide within a matrix of pyrolytic graphite in such a manner that the longitudinal axes of the aciculae are oriented approximately in the c-direction of the pyrolytic graphite crystallites, reduces the anisotropy normally characteristic of pyrolytic graphite alone. This results in substantially increased strength in the thickness dimension and improvement in other properties, such as thermal expansion. Additionally, the embedded silicon carbide aciculae interrupt the laminar pattern of the pyrolytic graphite and thus reduce its tendency to delaminate.

Since silicon carbide is considerably harder than pyrolytic graphite, the presence of the silicon carbide in the composite improves erosion resistance of the pyrolytic graphite composite. The presence of silicon carbide also improves oxidation resistance; while carbon oxidizes to gaseous CO and $CO_2$, silicon carbide oxidizes to solid or liquid $SiO_2$. Silicon dioxide formed by oxidization of the SiC in the composite fuses into a protective coating, inhibiting oxidization of underlying pyrolytic graphite.

DETAILED DESCRIPTION OF THE INVENTION

Figure 1:
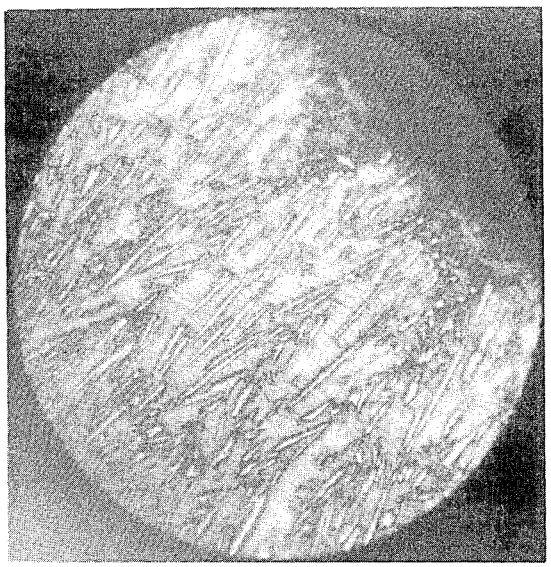
FIG. 1 is a photomicrograph at a magnification of 150 of a cross-section of a sample of a pyrolytic graphite-silicon carbide micro-composite. The turbine blades of the present invention are composed of such composites.
Figure 2:
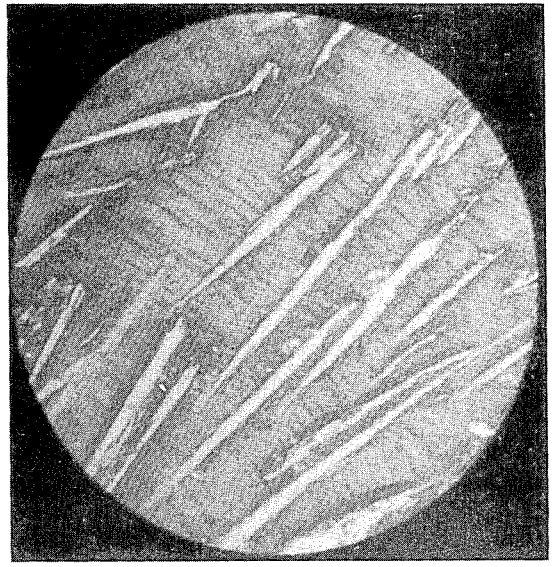
FIG. 2 is a photomicrograph at a magnification of 600 of the same section shown in FIG. 1.

The photomicrographs of FIGS. 1 and 2 at 150 x and 600 x magnification, respectively, clearly show the silicon carbide embedded in the pyrolytic graphite matrix. As shown in the photomicrographs, a large portion of the silicon carbide is in the form of needle-like aciculae oriented substantially perpendicularly to the codeposited laminar layers of pyrolytic graphite. The volume percent of the silicon carbide in the photomicrographed sample is about 20%.

The microcomposite can be made by vapor phase pyrolysis of a mixture of methyl trichlorosilane and a hydrocarbon gas onto a heated substrate. Apparatus and pyrolyzing techniques otherwise well known for the production of pyrolytic graphite may be employed. Pyrolysis may be conducted at reduced or atmospheric pressure. Atmospheric pressure is preferred, for convenience and because of the excellent results obtained.

Figure 3:
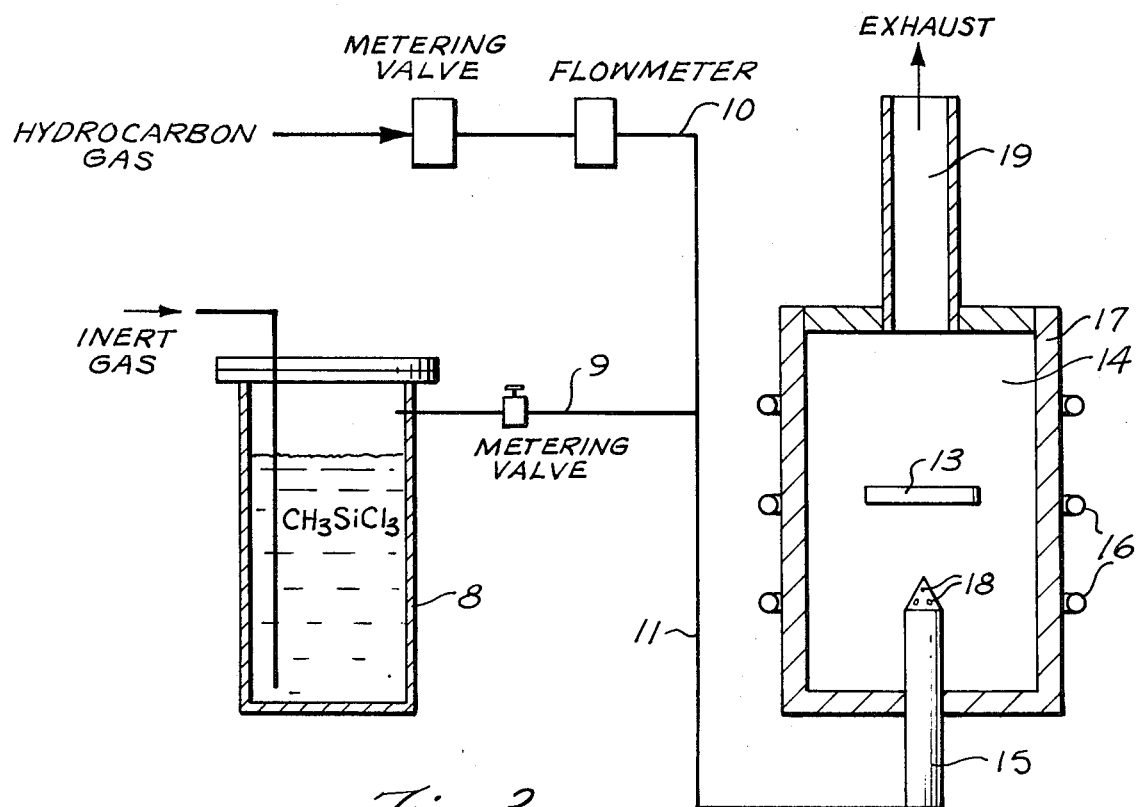
FIG. 3 is a schematic illustration of the apparatus used in the preferred manufacturing process for the article of this invention.

Suitable apparatus for preparing the composites of which the internal turbine engine components of the present invention are composed, is schematically illustrated in FIG. 3. In operation, methyl trichlorosilane is aspirated by means of inert gas from a suitable container, such as pressure vessel 8 through line 9 to line 11 and into injector tube 15. Preferably, an appropriate conventional metering valve, by which the flow rate of the $CH_3SiCl_3$ may be regulated, is included in line 9. Simultaneously, a hydrocarbon gas is fed through line 10 to line 11, where it mixes with the $CH_3SiCl_3$, and into injector tube 15. Preferably, line 10 includes an appropriate conventional metering valve and a conventional flow meter.

The mixture of methyl trichlorosilane and the hydrocarbon gas passes through injector tube 15 and exits through ports 18 into chamber 14 of furnace 17. Upon entry into chamber 14, the $CH_3SiCl_3$-hydrocarbon gas mixture impinges upon substrate 13 suspended in furnace 17. Furnace 17 and substrate 13 are heated to a temperature sufficient to pyrolize the methyl trichlorosilane and hydrocarbon gases (about 2800°F – 4000°F and preferably, 3200°F – 3800°F) as by heating coils 16. It will be appreciated that any conventional induction, radiant, or resistant heating means may be employed.

To prevent oxidation of the carbonaceous gas, atmospheric oxygen is removed and continuously excluded from chamber 14. Atmospheric oxygen may be removed from chamber 14 through exhaust port 19 by evacuation and/or purging with inert gases, such as helium or nitrogen, using conventional means (not shown).

Pyrolysis of the methyl trichlorosilane and hydrocarbon gas occurs when the gas mixture impinges upon heated substrate 13. Upon pyrolysis, a pyrolytic graphite-silicon carbide microcomposite is formed on substrate 13. The microcomposite is composed of pyrolytic graphite crystallite layers containing embedded, codeposited aciculae of silicon carbide oriented perpendicularly to the ab-plane of the crystallites. A substantial portion (at least 50% of the volume) of SiC present in the composite comprises distinct aciculae having a length-to-diameter ratio of at least 2:1, and preferably at least 4:1.

The hydrocarbon gas can be any of those generally employed in producing pyrolytic graphite by vapor phase deposition. Such gases include the lower alkanes, e.g. methane, ethane, and propane; ethylene, acetylene, mixtures thereof, etc. Methane is preferred. It is generally desirable to include in the pyrolysis mixture, an inert gas such as argon, nitrogen, helium, hydrogen, or mixtures thereof. All or part of the inert gas may be used to aspirate liquid methyl trichlorosilane.

The relative flow rate of the methyl trichlorosilane and hydrocarbon gas vary generally with the desired microcomposite composition. In general, the silane may be introduced at a weight percent flow rate of about 5 – 75%, and preferably about 15 – 50%, and the hydrocarbon gas at a weight percent flow rate of about 25 – 95%, and preferably about 85 – 50%.

In some applications, it may be desired to have a microcomposite of graded relative pyrolytic graphite and SiC composites. For example, in some instances it may be desirable for the outermost portion of the composite to have a higher SiC content than the inner portions of the composite. Such a graded composite would be suitable to minimize oxidative surface erosion. When graded composites are desired, the respective flow rates of methyl trichlorosilane and hydrocarbon gas may be suitably varied during pyrolysis.

While FIG. 3 shows a flat substrate, substrate 13 may be of any desired shape. For example, the composite may be deposited on an irregularly shaped substrate, or on flat or curved plate surfaces. After completion of the build-up of the composite, the substrate can be removed from chamber 14, the composite removed from substrate 13 and formed into a turbine blade or other internal component for a gas turbine engine.

Alternatively, a machined graphite shape of a desired configuration may be employed as the substrate and a coating of pyrolytic graphite-silicon carbide material deposited thereon. Such a substrate may form an integral part of the ultimate end product; the composite coating will be tightly adherent to the graphite substrate. By varying relative thickness of the graphite substrate and the deposited coating, a variety of shapes and properties can be achieved. For example, an entire turbine wheel and blade assembly can be machined from a single piece of graphite and subsequently coated in accordance with the process described above to yield a one-piece turbine wheel-blade construction. Graphite material, such as Union Carbide's Grade ATJ graphite, has been found to have properties which render it compatible with the pyrolytic graphite-silicon carbide codeposit.

Whether the composite is removed from the substrate, or the substrate forms an integral part of the ultimate end product, the product may be shaped if necessary, by machining or other forming techniques after deposition.

Figure 4:
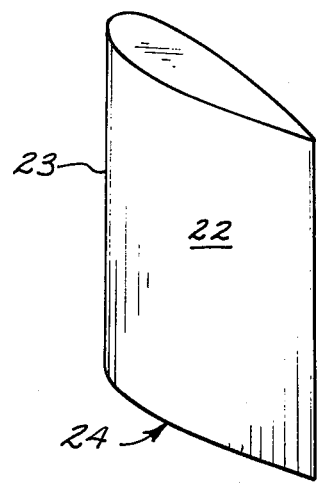
FIG. 4 is an illustration of the article of the present invention.

An example of a finished turbine blade is shown in FIG. 4. This blade 22 has a rounded edge 23 and a gradual rearward taper. The blade is designed to be attached to a turbine wheel (not shown) or the like, on its side face 24 and thereby project radially outwardly from the wheel surface.

The embedded, codeposited silicon carbide aciculae tend to prevent propogation of cracks and delaminations. Composite strength in the thickness direction is significantly enhanced. In addition, the marked disparity in thermal expansion in the ab and c-directions characteristic of conventional pyrolytic graphite is reduced.

Surprisingly, the codeposits of the present invention have been found to have longer (great length-to-diameter ratio) aciculae than pyrolytic graphite-silicon carbide codeposits prepared in accordance with the process of copending application Ser. No. 161,007. This is believed to be due in part to the fact that the copending application involves insertion of a reinforcing refractory strand in the composite, by rotating the substrate. The rotating substrate and the insertion of the strands of the copending case is not believed to be as conducive to the formation of long aciculae as the relatively static substrate which may be employed in the preparation of the codeposits of the present invention.

Samples of composites containing 25% by volume silicon carbide aciculae have been subjected to direct impingement of a 4500°F oxy-acetylene flame for periods of up to 5 minutes with no weight loss. In similar composites, tensile strengths in the range of 23,000 psi in the ab-direction and 6000 psi in the c-direction have been measured. Typical densities are about 2.3 g/cc.

Composites of pyrolytic graphite containing 20% by volume SiC have been found to have the following properties:

| DIRECTION | FLEXURE STRENGTH psi | ELASTIC MODULUS psi | THERMAL EXPANSION 70 to 4500° F in/in × $10^{-6}$/°F | THERMAL CONDUCTIVITY Btu/in/sec/ °F × $10^{-3}$(2500°F) |
| --- | --- | --- | --- | --- |
| ab | 40,000 | 5 × $10^6$ | 3.0 | 1.1 |
| c | — | — | 3.2 | 0.05 |

Although this invention has been described with reference to illustrative embodiments thereof, it will be apparent to those skilled in the art that the principles of this invention can be embodied in other forms but within the scope of the claims.

What is claimed is:

1. A rotor blade, stator vane or shroud ring for a gas turbine prepared from a composite comprising of pyrolytic graphite and silicon carbide in which said pyrolytic graphite comprises layers of crystallites of pyrolytic graphite and said silicon carbide comprises codeposited crystalline aciculae embedded in said crystallites, said aciculae being oriented so that the longitudinal axes of said aciculae are substantially aligned in the c-direction relative to the a-b plane of the associated pyrolytic graphite crystallite, said silicon carbide comprising between about 5% and 95% by volume of said composite.

2. The article of claim 1 in which said composite comprises at least 10% by volume silicon carbide.

3. The article of claim 1 in which said composite comprises about 10 to 50 volume percent silicon carbide.

4. The article of claim 1 in which said composite comprises a graded relative pyrolytic graphite and silicon carbide composition, in which the relative amounts of each ingredient vary with distance from the surface of the microcomposite.

5. The article of claim 4 in which the outer portion of the composite has a higher silicon carbide content than the inner portions of the composite.

6. The article of claim 1 in which at least 50% of the volume of silicon carbide present in said composite comprises aciculae having a length-to-diameter ratio of at least 2:1.

7. The article of claim 1 in which at least 50% of the volume of silicon carbide present in said composite comprises aciculae having a length-to-diameter ratio of at least 4:1.

8. The article of claim 1 which is in the form of a turbine blade.

9. The article of claim 1 in which said composite forms a coating on a graphite substrate.

* * * * *